United States Patent [19]

Larsen

[11] Patent Number: 4,495,313

[45] Date of Patent: Jan. 22, 1985

[54] PREPARATION OF HYDROGEL FOR SOFT CONTACT LENS WITH WATER DISPLACEABLE BORIC ACID ESTER

[75] Inventor: Hans-Ole Larsen, Farum, Denmark

[73] Assignee: Mia Lens Production A/S, Copehagen, Denmark

[21] Appl. No.: 360,107

[22] Filed: Mar. 19, 1982

Related U.S. Application Data

[63] Continuation-in-part of Ser. No. 259,115, Apr. 30, 1981, abandoned.

[51] Int. Cl.³ .......................... C08K 5/05; C08F 2/16; C08L 33/08
[52] U.S. Cl. .................. 523/106; 523/108; 526/195
[58] Field of Search ............... 523/106, 108; 526/195

[56] References Cited

U.S. PATENT DOCUMENTS

| | | | |
|---|---|---|---|
| 3,965,063 | 6/1976 | Holcombe | 523/106 |
| 4,056,496 | 11/1977 | Mancini et al. | 523/106 |
| 4,275,174 | 6/1981 | Tadakoro et al. | 526/195 |
| 4,405,773 | 9/1983 | Loshaek et al. | 523/106 |

*Primary Examiner*—Harold D. Anderson
*Attorney, Agent, or Firm*—Lawrence Rosen

[57] ABSTRACT

Soft contact lenses are made by polymerizing a substantially anhydrous polymerization mixture containing a polymerizable acrylic or methacrylic monomer, and a water displaceable ester of boric acid and a compound containing 3 or more hydroxyl groups so as to form a hydrophilic polymer containing at least 30% of said boric acid ester. In a preferred embodiment, the polymerizable is effected in a mould cavity where the contact between a sharp circular edge in one mould part and a spherical surface in the other mould part defines the edge of the lens and the distance between the two mould surfaces outside the sharp edge increases in all radial directions away from the center.

13 Claims, 1 Drawing Figure

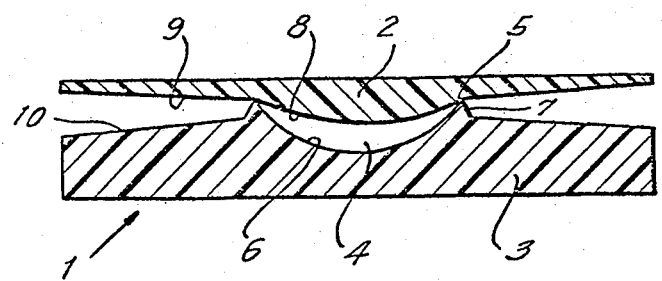

PREPARATION OF HYDROGEL FOR SOFT CONTACT LENS WITH WATER DISPLACEABLE BORIC ACID ESTER

This application is a continuation-in-part of Ser. No. 259,115 filed Apr. 30, 1981, now abandoned.

BACKGROUND OF THE INVENTION

Contact lenses are either of the "hard" or "soft" variety. The hard contact lenses are made from polymers with a relatively low degree of hydrophilicity and can be produced by conventional production methods for shaped objects, such as for instance, the formation of cylindrical blocks or pressing in heated moulds. In use, however, the hard lenses are often found to be unpleasant due to irritation of the eye.

The soft contact lenses are made from polymers having a high degree of hydrophilicity which, during manufacture, are swollen with water to form a gel containing at least 30% water and often over 70% water. Such lenses are soft and gelatinous, adjust extremely well to the eye and are therefore more pleasant to wear.

U.S. Pat. No. Re. 27,401 describes one class of hydrogels which can be formed from 20-97% of an aqueous liquid gelled with a sparingly cross-linked copolymer formed from a major amount of a hydrophilic monoester of acrylic or methacrylic acid cross-linked with a minor amount of a diester of these acids. The commercial soft contact lenses of this type appear to contain a polymer network formed from large amounts of hydroxyethyl methacrylate (HEMA) cross-linked with small percentages of glycol dimethacrylate. Other known hydrogels contain acrylic monomers together with vinyl pyrrolidone type polymers. See, e.g., U.S. Pat. Nos. 3,639,524 and 3,621,079. Another hydrogel described in the literature is a copolymer of acrylamide with an acrylate or methacrylate. See, e.g., U.S. Pat. No. 4,067,839.

The known methods of manufacturing soft contact lenses present a series of problems which have made the lenses costly and also have limited their use. According to one known method, the lenses are made by turning a cylindrical rod of the appropriate polymer of high hydrophilicity on a lathe. Problems are encountered because of the relative soft nature of the polymers and the high degree of accuracy required and also because of the minute dimensions of the unswollen lens. In a later process step, the lenses are swollen with water causing the lenses to change size and shape. As a result, the optical properties of each lens has to be measured after the swelling step.

Another known method of manufacture involves the casting and polymerization of suitable lens material in an open rotating mould. In this spin casting technique, the shape of the lens is determined by the centrifugal and surface tension forces acting on the resin during cure. After curing is complete, the lenses are swollen with water resulting in the same problems described above.

The more water the lenses contain, i.e., the higher the degree of swelling, the more comfortable are the lenses in use. Unfortunately, the more water used, the more the control over the final optical properties is reduced.

The mechanical strength of the lenses is also proportional to the polymer content so that higher water contents have lower mechanical strength. Moreover, lenses having higher water content are more readily attacked by microorganisms or suffer from a build up of denatured proteins and other impurities in the gel, all of which can lead to serious allergic reactions or eye disease.

The high cost of manufacture of soft contact lenses prevents systematic replacement of the lenses when contaminated and instead an elaborate system of washing the lenses overnight and frequent boiling must be established in order to maintain an acceptable hygienic state.

A new method has now been developed which permits the accurate and facile production of soft contact lenses which offer a high degree of comfort when in use coupled with a high degree of optical precision while at a price which permits replacement with fresh lenses at short intervals if so desired. These lenses have a water content of at least about 30%. At higher levels of 70-75% water, the lenses can remain in place day and night for extended periods of time up to about 14 days. At lower water levels, the lenses should be removed overnight.

SUMMARY OF THE INVENTION

The present invention relates to soft contact lenses and the method by which they are formed. More particularly, the lenses are formed by polymerizing a vinyl, acrylic or methacrylic monomer together with a water displaceable ester of boric acid and a compound containing 3 or more hydroxyl groups so as to form a polymer containing at least 30% of the boric acid ester. Thereafter, an exchange between water and the boric acid ester is effected. The invention is also concerned with the novel hydrogels formed during the manufacturing process and a special lens mould which can be utilized.

DESCRIPTION OF THE DRAWING

The sole FIGURE is a schematic cross-section of the preferred soft contact lens mould used in the present invention.

DESCRIPTION OF THE INVENTION

In accordance with the present invention, a hydrogel of improved mechanical and optical properties appropriate for use in a soft contact lens is prepared utilizing any of the polymerization systems employed heretofore except that the polymerization system is substantially anhydrous and in place of the water, a water soluble and displaceable ester of boric acid and a compound containing 3 or more hydroxyl groups is used.

After formation of the gel, the water soluble boric acid ester is displaced with water so that the final water content is at least 30% and preferably at least 50% and most preferred at least 70%. Extended wear lenses will generally have a water content of 70-75%. Thus, for example, the acrylic or methacrylic monomer system of U.S. Pat. No. Re. 27,401 which is a combination of an acrylic or methacrylic acid monoester with a minor amount of a diester of acrylic or methacrylic acid can be utilized in the present invention. As also disclosed in U.S. Pat. No. Re. 27,401 the monoesters are hydrophilic hydroxy esters of acrylic or methacrylic acids and a polyhydric alcohol. Similarly, polymerization systems in which vinyl, acrylic or methacrylic monomers are copolymerized with such materials as hydroxyethyl acrylate, vinyl pyrrolidone, acrylamides, or the like can be used. As examples: hydroxyethylmethacrylate, methylmethacrylate, hydroxypropylmethacrylate, glycidylmethacrylate,, diacetoneacrylamide or vinyl acetate can be used in combination with acrylamide, hydroxyethylacrylate, acrylic acid, or glycerylmethacrylate, and dimethylamino ethyl acrylate.

At present, it is preferred that the polymerizable acrylic monomer is hydroxy ethyl methacrylate (HEMA) and most preferably, the polymerizable acrylic monomer is a combination of a major portion of HEMA combined with a minor portion of another monomer, which is preferably hydroxy ethylacrylate (HEA).

A small amount of a crosslinking agent with a functionality of 2 or greater may be added to the monomer or monomer mixture. As an example of a preferred crosslinking agent, ethylene glycol dimethacrylate can be mentioned.

The form-stability of the lens will increase with the addition of a crosslinking agent, but the tear strength will decrease. It has been found that polymerization in the presence of the boric acid ester according to the invention in itself gives better formstability and the amount of crosslinking agent can be kept very low, even to the degree that for some commercial monomers the desired properties can be obtained with no crosslinking agent added.

The polymerization is effected in the substantial absence of water. It has been found that the presence of water usually leads to incomplete polymerization and very low strength. Clear lenses of better mechanical properties have been obtained by conducting the polymerization in the presence of water soluble materials which do not react during the process and which can be replaced by water, for example, ethylene glycol, diethylene glycol and glycerol. This method is, however, deficient since, when using the desired low level of crosslinking agent, there is no direct relationship between the amount of water soluble material used and the amount of water found in the hydrogel after washing (a replacement procedure). Also there is not sufficient compatibility of the polymer with high percentage of the water soluble material resulting in milky or hazy lenses. This is a serious obstacle when it is desired to produce a lens of high final water content. It has been found possible to reduce the tendency to haziness by using a mixture of glycerol and a solvent such as, for example, 2 ethoxy-ethanol, but these lenses are inferior mechanically in that they are weak and brittle. Further, the 2-ethoxyethanol is difficult to remove from the lens.

In the present invention, the haziness and poor mechanical properties are overcome by employing the glycerol in the form of a reaction product with boric acid as the solvent, diluent or extender during polymerization. This procedure also permits control of the water content in the final lens and permits the production of lenses which have the same shape and size as the mould cavity in which they were polymerized.

The reaction product, or ester, is prepared in the normal fashion by, for example, heating boric acid and a polyhydroxyl compound with three or more hydroxyl groups which can be glycerol, trimethylolpropane, glucose and the like or a mixture of such polyhydroxyl compounds with another hydroxyl compound having two hydroxyl groups such as, for example, propylene glycol, diethylene glycol, butane diol, etc. under vacuum and removing the water of reaction. Also boric acid can be reacted with mixtures of two or more polyhydroxyl compounds such as glycerol and sorbitol or mixtures of polyhydroxyl compounds with two or more hydroxyl compounds can be used. The ratio of boric acid to hydroxyl containing compound(s) is about 10:90 to 50:50 by weight.

Preferably the ratio of boric acid to hydroxyl containing compounds is about 20:80 to 45:55 and the ratio of boric acid to polyhydroxyl compound is about 15:85 to 40:60 by weight.

As but one example, a suitable ester can be prepared by heating 160 parts of glycerol and 40 parts of boric acid to 80° C. under vacuum and distilling off about 33 parts of water. The boric acid ester has a relatively high viscosity compared to water, of at least 500 centipoises and preferably is about 2000 centipoises. The viscosity of the boric acid ester is an important factor in the process, since it apparently controls the strength of the final polymer gel, and also determines the time at which the lens being prepared in the mould is finally cut off from the reservoir. Very useful boric acid esters having viscosities of about 20,000 centipoise have been prepared from boric acid glycerol and 1,2-propandiol and with viscosities of about 30,000 centipoises from boric acid, sorbitol and 1,2-propandiol. The choice of boric acid ester to be used may depend on the acrylic or vinyl monomer or combination of two or more copolymerizable monomers to be polymerized. Preferably the monomers should remain compatible with the ester throughout the polymerization which easily can be determined by simple trails.

As a general rule, the boric acid ester will constitute about 30–90 volume %, preferably about 45–80 volume percent, based on the combined volume of the monomers being polymerized and the boric acid ester.

Without wishing to be limited to theory, it is possible that the effect of the boric acid ester can be explained in terms of its high viscosity and solvent properties. The ester may induce a gel effect from a very early stage of the reaction so that the reacting polymer chains are prevented from moving and thereby from mutual termination, so that only monomers can move and build up long chains at a high rate and with only sporadic termination. Water and other diluents previously known act more like solvents so that the reactive polymer chains are free to move leading to more frequent mutual termination and a lower molecular weight polymer. On the other hand, the boric acid ester could induce a stereoregularity to the hydrogel. Whatever the mechanism, a great advantage of the boric acid ester is that in spite of its high viscosity, it is easily washed out of the lenses and replaced by water. In water, the ester splits into its component parts, boric acid and glycerol which are small, highly soluble molecules and are easily eliminated from the lens.

The polymerization can be catalyzed by any of the processes employed heretofore. Although conventional thermal induced polymerization can be effected, it has been noted that this process tends to lead to stress and decreased homogeneity in the lenses. It is therefore preferred to induce polymerization in the systems of the present invention by means of ultraviolet light. Accordingly, if desired or necessary, an ultraviolet light catalyst can be added to the polymerization system. The photocatalyst used can be any of the known catalysts sufficiently soluble in the monomer mixture to effect an essentially complete polymerization. Typical examples are the commercial UV catalysts sold under the tradenames Darocur 1173 and 1176. As the catalyst fragments become an integral part of the polymer it may be chosen to give a desired light-filter effect.

Although the soft contact lenses can be produced by any of the procedures described above or used in the art, it is preferred to effect direct polymerization in a mould cavity which has substantially the same size and shape as the final lens. Thus, the mould cavity should correspond to the shape of the water swollen end product and have a volume of about 60–125% of the volume of the desired end product, preferably about 95–105%, and most preferably about 100% of the volume.

As is well known, there is a negative volume change which occurs during the polymerization of these monomer systems. In order to avoid cavitation and to facilitate opening of the mould without putting harmful stress on the soft lens, one mould section must be thin and elastic which can lead to complications in forming the lenses. It has now been found that the shrinkage can be substantially compensated for by providing a small amount of monomer in contact with the polymerization system inside the mould cavity. The quantity of monomer serves as a reservoir from which monomer can be sucked into the mould cavity as a result of the under pressure resulting from the shrinkage.

The edge of the contact lens must be thin and yet smooth without irregularities which can irritate the eye lid or the conjunctiva. Machining a suitable edge after casting is nearly impossible. It has been found that if the mould is suitably shaped, the slight under pressure resulting from the shrinkage can be used as a means for cutting the edge during a later stage of curing and as a device for transfering monomer to the mould to compensate for shrinkage. The preferred mould is shown in the sole FIGURE. The mould 1 takes the form of an upper part or lid 2 which is relatively thin while the lower part 3 has a more complicated shape. The surfaces outside the mould cavity 4 have a shape such that there is contact between the upper and lower parts 2, 3, in a shaped ring 5 around the mould cavity 4 only and the distance between the two surfaces increases in all radial directions away from the center. More particularly, the lower part 3 has a concave surface portion 6 which has a relatively sharply defined peripheral edge portion 7 in an annular region thereof. The lid 2 has a convex surface portion 8 in an annular region thereof. When lid 2 and lower part 3 are placed together, the concave portion 6 and convex portion 8 jointly define a volume 4 which has a contact lens shape therebetween when the edge portion 7 engages a cooperating annular region on the convex surface. The convex surface portion and the concave surface portion are provided with peripherally extended skirt regions 9, 10 which are spaced apart from one another and have increasing spacing of regions further removed from the periphery of said edge 7.

The ring shaped converging reservoir 11 defined by the space between skirt portions 9, 10 provides a receptacle for monomer during polymerization. As the polymerization reaction progresses, shrinkage of the contents of the mould occurs creating a slight negative pressure. The negative pressure causes additional monomer to be sucked into the mould cavity 4 sufficient to compensate for the shrinkage and the lid 2 aligns itself correctly over the mould cavity 4. At a later stage of the polymerization, the viscosity of the polymer solution has increased and flow abates which results in an increase of the negative pressure and, as a consequence, the relatively sharp edge 7 impinges against the lid at 5 to thereby provide a neat, well defined contact lens edge which is substantially free from irregularities whereupon the final crosslinking takes place. Lid 2 and lower part 3 can be formed from any suitable mould material. Since it is preferred to effect curing by the application of ultraviolet light, at least one of the mould parts, preferably lid 2, is constructd of a material which is transparent to ultraviolet light. Polymethyl pentene is presently preferred but any other UV transparent material can also be used such as polystyrene.

Although not shown, another mould construction may be utilized wherein a first mould section has a concave surface portion, a second mould section has a sharply defined peripheral edge portion in an annular region of said second mould section, said concave and convex surface portions adapted to jointly form a volume having a contact lens shape therebetween when said relatively sharply defined peripheral edge portion engages the concave surface of said first mould section.

After formation of the contact lens, it is contacted with water or water containing small amounts of additives such as salt or various bacteriostatic agents for a time sufficient to replace all of the boric acid ester with the water.

It further has been found that the method of making a contact lens according to the present invention offers so accurate control of the lens dimensions that new ultrathin soft contact lenses can be produced. For instance, lenses having negative dioptry and a thickness in the central optical area of less than 0.1 mm, typical 0.07 mm and often 0.04 mm, can be made in a reproducible manner.

The small thickness of the lens results in high comfort during use. Further, the small thickness gives an improvement in oxygen transmission. The living eye demands a certain amount of oxygen otherwise conjunctivity and oedema of the cornea will develop. The amount required varies from person to person and certain groups of users cannot use present day lenses for more than a short period. The oxygen transmission through a contact lens is to some extent an inverse function of the thickness so the new lenses offer the use of extended wear contact lenses for new groups of persons.

The improvement in oxygen transmission has in practice been so large that comfortable lenses with sufficient oxygen permeability can be made at low water contents of, for example, 30% water. Such lenses can be made from, for example, hydroxy ethyl methacrylate combined with a monomer of low polarity such a vinyl acetate, methylmethacrylate, acrylonitrile and the like.

Various examples are given below in order to more fully illustrate the present invention. It will be appreciated that throughout this specification and claims, all parts and percentages have been by weight and all temperatures have been in degrees centigrade, unless indicated otherwise. The preferred lens mould discussed in detail above was used in forming the lenses.

EXAMPLE I 160 g of glycerol were mixed with 40 g of boric acid and then heated to 80° C. under vacuum. 30 g of water were distilled and the resulting ester recovered. To make a lens with approximately 75% water, two stock solutions of monomer/boric acid ester are prepared, each containing about 75% of boric ester by volume.

|   | A, grams | B, grams |
| --- | --- | --- |
| Boric acid ester | 55 | 55 |

| | A, grams | B, grams |
|---|---|---|
| Hydroxyl ethyl methacrylate (HEMA) | 15 | |
| Hydroxyl ethyl acrylate (HEA) | | 15 |
| Ethyleneglycol dimethacrylate (EDMA) | 0.05 | 0.05 |
| Darocur 1173 (2-hydroxy-2 methyl-1-phenyl-propan-1-on) | 0.1 | 0.1 |

Each of the two stock solutions polymerized alone will give a polymer containing 0.25 gram per milliliter the remaining volume being boric acid ester. When washed in 0.9% aqueous sodium chloride, A will shrink, and B will expand. By a couple of trials it was found that 2 parts B plus 3 parts A will give a lens which after washing has the same volume and shape as the mould cavity and contains 75% water by volume. To prepare lenses with other water contents the amount of boric acid ester is adjusted accordingly.

The lenses are mechanically strong and have much better handleability than lenses polymerized without the use of boric acid ester.

EXAMPLE 2

75 g of glycerol were mixed with 27 g of boric acid and water was removed under 10 mm Hg vacuum at 80° C. The resultant ester was used in the following mixture:

| Boric acid ester | 17.5 grams |
|---|---|
| HEMA | 20 |
| EGDMA | 0.1 |
| Darocur 1176 (1-(4-isopropyl-phenyl)-2-hydroxy-2-methyl-propan-1-on) | 0.1 |

The mixture was polymerized for 5 minutes in a lens mould with two Philips TL 40/09 ultraviolet lamps placed 3.5 cm over the mould. When washed in isotonic salt solution the lens has the same size and shape as the mould cavity and contains about 40% water and good mechanical properties.

EXAMPLE 3

In this example mixture 3-c illustrates the invention while 3-a and 3-b are included for comparative purposes only.

| | 3-a | 3-b | 3-c |
|---|---|---|---|
| HEMA | 11 | 11 | 11 |
| HEA | 4 | 4 | 4 |
| Darocur 1173 | 0.4 | 0.4 | 0.4 |
| Ethoxyethanol | | 5 | |
| Triethanolamin (a cocatalyst) | | 0.5 | |
| Glycerol up to | 50 g | 50 g | |
| Boric acid ester prepared from 30 p glycerol and 6 p boric acid up to | | | 50 g |

All three mixtures are polymerized for 5 minutes in the same mould using ultraviolet irradiation. During the polymerization mixture 3-a turns opaque while 3-b and 3-c remain clear. After washing 3-a and 3-b are very weak, jellylike, while 3-c gives a perfectly clear lens with good mechanical strength easily handled by the user.

EXAMPLE 4

Lenses were cast from the following compositions:

| | 4-1 | 4-2 |
|---|---|---|
| HEA | 13 grams | 11 grams |
| Methylmethacrylate | 2 | |
| Diacetoneacrylamide | | 4 |
| Ethylene glycol dimethacrylate | 0.05 | 0.05 |
| Darocur 1173 | 0.1 | 0.1 |
| Boric Acid - glycerolester (25:75) | 55 | 55 |

Polymerization was initiated with ultraviolet light as in Example 2. The lenses remained clear throughout the process. After washing, the size and shape corresponded well to the mould and the lenses were easily handled by the user.

EXAMPLE 5

Example 4 was repeated using composition 4-1 but instead of the boric acid-glycerol ester 25:75, 55 parts of an ester prepared from boric acid 123,5, glycerol 184.2 and diethylenglycol 106 was used. During the preparation of the ester 99.9 p water had been removed. The experiment gave similar results as example 4.

EXAMPLE 6

Lenses were cast from the following mixture:

| Hydroxy ethylmethacrylate | 9 grams |
|---|---|
| Vinylpyrrolidone | 6 |
| Ethylene glycol dimethacrylate | 0.05 |
| Darocur 1173 | 0.1 |
| Boric acid/glycerol ester 20:80 | 50 |

The lenses remained clear and had correct size and good mechanical properties.

EXAMPLE 7

A casting was made from the following mixture:

| Vinylacetate | 2 grams |
|---|---|
| Hydroxyethylacrylate | 13 |
| Ethylene glycol dimethacrylate | 0.05 |
| Darocur 1176 | 0.1 |
| Boric acid/glycerol ester 25:75 | 55 |

After washing, the lens is 30% larger in diameter than the mould, but has nevertheless good properties.

The experiment is repeated with a mixture in which the vinyl acetate content has been increased from 2 p to 4 p. This time the size corresponds more closely to the size of the mould.

EXAMPLE 8

A boric acid ester was prepared from boric acid 150 p, glycerol 150 p, 1-2 propandiol 200 p at 80° C. and a vacuum of 10 mm Hg, 139.7 p water was collected in the receiver.

Lenses were cast using the following mixture:

| HEA | 13 grams |
|---|---|
| Vinyl acetate | 2 |
| Methylmethacrylate | 2 |
| Polyethyleneglycol 400-diacrylate | 0.1 |
| Darocur 1173 | 0.1 |
| Boric acid ester | 60 |

The polymerization was very rapid and gave perfectly clear casting which after washing in 0.9% aqueous sodium chloride had size and shape corresponding well with the mould.

EXAMPLE 9

An ester was prepared from sorbitol 45, boric acid 30, 1-2 propandiol 75, using conditions as in Example 8.

| HEA | 6 grams |
|---|---|
| HEMA | 9 |
| Difunctional diacrylate ester | 0.05 |
| U-V catalyst | 0.1 |
| Boric acid ester | 55 |

Lenses prepared from the mixture were clear, easy to handle without damage and had exactly the same size as the moulds used.

EXAMPLE 10

A casting is made from the following mixture:

| Hydroxy ethyl methacrylate | 90 grams |
|---|---|
| Methylmethacrylate | 10 |
| Ethyleneglycol dimethacrylate | 0.05 |
| UV catalyst (Darocur 1173) | 0.05 |
| Boric acid/glycerol ester 25:75 | 58 |

The lens is cast in a polystyrene mould and cured for 10 minutes under UV light.

The lens is first washed in hot water for 2 hours and then placed in an isotonic solution of sodium chloride overnight. The lens in equilibrium with the isotonic solution has dimensions corresponding closely to the dimensions of the mould. The lens is of minus four dioptry. It has a thickness of only 0.08 mm, and a water content of 30%.

Various changes and modifications can be made in the process and products of this invention without departing from the spirit and scope thereof. The various embodiments which have been disclosed herein were for the purpose of further illustrating the invention but were not intended to limit it.

What is claimed is:

1. A method of forming a hydrogel of improved mechanical and optical properties appropriate for use in a soft contact lens which comprises providing a substantially anhydrous polymerizable mixture of a polymerizable, hydrophilic hydroxy ester of acrylic or methacrylic acid and a polyhydric alcohol, and a water displaceable ester of boric acid and a polyhydroxyl compound having at least 3 hydroxyl groups or mixtures thereof, causing said mixtures to polymerize so as to form a hydrophilic polymer containing at least 30% by volume of said boric acid ester, and displacing said boric acid ester with water.

2. The method of claim 1 wherein the ratio of boric acid to the polyhydroxy-containing compound is about 10:90 to 50:50 by weight.

3. The method of claim 2 wherein the boric acid ester is about 30–90 volume percent based on the combined volume of said monomer and said ester.

4. The method of claim 3 wherein said hydroxy ester of acrylic and methacrylic acid comprises hydroxyethyl methacrylate and the volume ratio of said boric acid ester to said monomer is about 30:70 to 50:50.

5. The method of claim 1 wherein said mixture is polymerized in a mould in contact with a reservoir of additional polymerizable mixture.

6. The method of claim 1 wherein said polymerization is ultraviolet light polymerization.

7. The method of claim 1 wherein said hydrogel has a water content of at least about 30% by volume.

8. The method of claim 1 wherein said polyhydroxyl compound is glycerol.

9. The method of claim 1 wherein said polyhydroxyl compound is sorbitol.

10. The method of claim 1 wherein said polyhydroxyl containing compound comprises propylene glycol.

11. The method of claim 1 wherein said ester of boric acid has a viscosity of at least about 500 cps.

12. The method of claim 1 wherein said polymerizable mixture comprises hydroxyethyl methacrylate; a minor amount of a compound selected from the group consisting of hydroxyethyl acrylate, vinyl pyrrolidone and acrylonitrile; and said water displaceable ester of boric acid and a polyhydroxyl compound.

13. The method of claim 8 wherein the ratio of boric acid to glycerol is about 10:90 to 35:65 by weight.

* * * * *